Patented May 8, 1951

2,551,732

UNITED STATES PATENT OFFICE 2,551,732

PRODUCTION OF ESTERS AND POLYESTERS

James Gordon Napier Drewitt, Spondon, near Derby, and James Lincoln, London, England, assignors to Celanese Corporation of America, a corporation of Delaware No Drawing. Application October 28, 1947, Serial No. 782,678. In Great Britain November 12, 1946

1 Claim. (Cl. 260—75)

This invention relates to improvements in the production of esters, and is more particularly concerned with the production of intermediate monomeric esters and the production therefrom of polyesters.

We have found that a very convenient way of making polyesters from dicarboxylic acids and volatile glycols consists in first reacting the sodium salt of the dicarboxylic acid, or other salt of the dicarboxylic acid and a strong base, with at least two molecules of a halogen hydrin, separating the sodium halide or other halide salt formed as a by-product and any unchanged raw materials, if desired working up the reaction product so as to form the pure bis-glycol ester of the dicarboxylic acid, and thereafter heating this ester until a polymer of the required molecular weight is produced. These bis-glycol esters of the dicarboxylic acids are new products and their production forms part of the present invention.

The bis-glycol esters may be produced by heating the sodium or other suitable salt of the dicarboxylic acid with the halogen hydrin, generally for several hours, separating the sodium chloride, sodium bromide or other halide salt which is usually deposited from the reaction mixture, evaporating off unchanged halogen hydrin, separating any unchanged dicarboxylic acid, for example by washing with sodium carbonate, and if desired separating, e. g. in the same operation, any mono-ester which is formed. We have found, however, that it is convenient to use more than the theoretical two moles of halogen hydrin so as to leave substantially no unreacted dicarboxylic acid after the reaction is complete. In some cases, the product, after separation of excess halogen hydrin and of the sodium chloride or other halide salt, contains a mixture of the required bis-glycol ester of the dicarboxylic acid together with some mono-ester. We find that this crude mixture is also suitable for the manufacture of a polyester and can be directly heated for the production of the polymer.

Suitable halogen hydrins for use in the present invention include ethylene chlorhydrin and bromhydrin, propylene chlorhydrin, trimethylene chlorhydrin and bromhydrin, tetramethylene chlorhydrin, ennea methylene bromhydrin (9-brom-1-nonanol), and decamethylene chlorhydrin and bromhydrin. Generally we prefer to use as the halogen hydrin an $\omega$-hydroxyalkyl halide, and specifically an $\omega$-hydroxypolymethylene chloride. All the above halogen hydrins, with the exception of propylene chlorhydrin, are $\omega$-hydroxypolymethylene halides.

While the invention may be applied to the production of esters and of polyesters from any dicarboxylic acids, including straight chain dicarboxylic acids, such as adipic acid, pimelic acid, suberic acid, azelaic acid and sebacic acid, it is of most value in the production of esters and polyesters from dicarboxylic acids which are ring compounds and in which the two carboxy groups are nuclear substituents. Such dicarboxylic acids may be carbocyclic dicarboxylic acids as, for example, terephthalic acid, 2.4-dichlorterephthalic acid, 4.4'-dicarboxy-diphenyl, 4.4'-dicarboxy-3.3'-dimethyl-diphenyl, $\alpha$-$\omega$-bis-(paracarboxy-phenyl)-alkanes, as for example 4.4'-dicarboxy-dibenzyl and $\alpha$-$\omega$-bis-(paracarboxyphenoxy)-alkanes, as for example $\alpha$-$\beta$-bis-(paracarboxy-phenoxy)-ethane; or heterocyclic dicarboxylic acids, as, for example, furane-2.5-dicarboxylic, thiophene-2.4- and 2.5-dicarboxylic acids, pyrane-2.6-dicarboxylic acid, pyridine-2.5-, 2.6- and 3.5-dicarboxylic acids, pyrazole-3.5-dicarboxylic acid and pyrrole-2.5-dicarboxylic acid. Especially important among the above ring dicarboxylic acids are those in which the carboxylic groups are co-planar with the ring or rings, as in terephthalic acid, 4.4'-dicarboxy-diphenyl, furane-2.5-dicarboxylic acid and thiophene-, pyrrole- and pyridine-2.5-dicarboxylic acids. Such dicarboxylic acids appear to lead to exceptionally high melting point in the polymers. Other dicarboxylic acids which may be used include para-phenylene diacetic acid, furane-2.5-diacrylic acid and similar dicarboxylic acids in which the carboxy groups are attached through one or more acyclic carbon atoms to positions remote from each other in the ring.

The production of the polyesters from the bisglycol esters of the dicarboxylic acids or from the crude mixture obtainable by reaction of the salt of the dicarboxylic acid with an excess over two moles of the halogen hydrin may be carried out by heating under such conditions that the volatile glycol which is combined in the starting ester is volatilised. The initial heating can be in the neighbourhood of 200° C., and subsequent heating at a temperature above the melting point of the polymer, say 220–230° C. The final heating may advantageously be carried out in a high vacuum, i. e. at an absolute pressure of less than 5 mms. and better still at a pressure of less than 1 mm. of mercury. It is of advantage to include in the reaction mixture an ester interchange catalyst, as, for example, an alkali metal, magnesium or tin.

The polymers produced according to the invention are of value in coating compositions and in moulding, and, when of sufficiently high molecular weight, can be spun into filaments. In forming filaments, the choice of the method of spinning depends in part on the properties of the polymers. Where solutions in organic solvents can readily be produced, dry spinning methods may be employed with solutions in volatile solvents, and wet spinning methods with solutions in volatile or even comparatively non-volatile solvents. The polymers can be spun by melt spinning methods, i. e. by extruding a melt of the polymer through suitable orifices. In general, the temperature of the polymer to be extruded should be some 10–30° above the melting point of the polymer. This melting temperature may be modified to some extent by mixing the polymer with suitable proportions of plasticisers, for example sulphonamide plasticisers, phenolic plasticisers, urea and thiourea plasticisers and the like. Such plasticisers may either be left in the products or may be partially or completely extracted therefrom.

The filaments so formed may be drawn out at comparatively low temperatures, or even at atmospheric temperature, to very fine filaments having high tenacity and good elasticity. The resulting filaments may then be used for any of the purposes to which artificial silks have in the past been applied.

While the invention is especially directed to the manufacture and application of fibre-forming polymers, it is not limited thereto and embraces the production of polymers suitable, for example, for use as softening agents, coatings, film-forming substances, and the like. Moreover, for these applications the polymers of the present invention may be mixed with other compatible fibre-forming, film-forming or lacquer substances or other ingredients, for example cellulose acetate, aceto-butyrate, butyrate and aceto-stearate, ethyl cellulose, oxyethyl cellulose, oxyethyl cellulose acetate, benzyl cellulose and other cellulose derivatives, plasticisers or softening agents, dyestuffs, pigments and the like.

The following examples illustrate the invention both as regards the production of the bis-glycol esters of the dicarboxylic acids as well as the production of the polymers from the pure bis-glycol esters and from the crude mixture of bis-glycol ester and mono-glycol ester.

*Example 1*

1 mole of terephthalic acid (calculated on the equivalent weight) was mixed with two moles of caustic soda in the form of an aqueous solution of 1.35 N concentration. The mixture was heated and allowed to simmer for half an hour when a clear yellow solution was obtained. The solution was made just alkaline to phenol-phthalein. 2 moles of redistilled ethylene chlorhydrin and 0.0075 mole of sodium iodide (as an aqueous 0.15 N solution) were then added and the mixture, which now contained a white precipitate, was refluxed gently for six hours. The mixture was distilled, water being added from time to time to maintain the volume of solution in the still base approximately constant. The distillation temperature was 96° C. at first (i. e. the boiling point of the ethylene chlorhydrin-water azeotrope) and after some time rose to 100° C. When no more ethylene chlorhydrin came over, the residual solution was cooled, left for some hours at 0° C. and filtered to give a filtrate A and a solid. The solid was washed with ice water, dried under vacuum, and then allowed to stand over-night with six times its weight of a 5% sodium carbonate solution. The solid was then again filtered off to give a filtrate B and the solid washed with ice-cold 5% sodium carbonate solution and with water and dried under vacuum. It was the bis-$\beta$-hydroxyethyl terephthalate and had a melting point of 109–110° C. It was twice recrystallised from hot water and gave beautiful white plates of melting point 110° C. Filtrate B was acidified with nitric acid diluted with an equal weight of water, allowed to stand at 0° C., the precipitate filtered off, washed with water and dried under vacuum at 100° C. to give a white solid, which was a mixture of terephthalic acid and its mono-hydroxyethyl ester and which was used in a new batch. Filtrate A was evaporated to small bulk and the precipitate filtered off, washed, dried and treated with sodium carbonate solution as described above to give a further quantity of the bis-$\beta$-hydroxyethyl terephthalate.

*Example 2*

A mixture of 1 mole of crude terephthalic acid (calculated on the equivalent weight which was 96.6) and 2 moles of caustic soda as a 2.5 N aqueous solution was heated and allowed to simmer for half an hour, and the resulting clear yellow solution made just alkaline to phenol-phthalein. 2 moles of redistilled ethylene chlorhydrin and 0.032 mole of sodium iodide were added and the solution refluxed for 3 hours. The solid which deposited on cooling and the filtrate were further worked up as in Example 1. The product after recrystallisation again had a melting point of 110° C. and gave on analysis C 56.71%; H 5.44%; saponification equivalent 128.7, 124.5. Theory $C_{12}H_{14}O_6$ requires C 56.63%; H 5.55%; saponification equivalent 127.

A repeat of the above using 4.8 moles of ethylene chlorhydrin gave the same product but did not leave any terephthalic acid unreacted.

*Example 3*

38.6 parts by weight of bis-$\beta$-hydroxyethyl terephthalate and 0.2 part by weight of clean magnesium ribbon were heated in a stream of hydrogen for 2 hours at 160–170° C. under an absolute pressure of 1–2 mms. and then for a further 2 hours at 225–235° under an absolute pressure of 0.5 mm. At this stage the polymer melted at 255° C. and was just capable of giving filaments from the melt. It was further heated for 3 hours at 260–270° C. first at an absolute pressure of 2 mms. and finally at 0.5 mm. The product was milky white and extremely hard, still melted sharply at 255° C. and readily gave filaments with cold-drawing properties.

*Example 4*

Direct production of polymer from the crude reaction mixture after removal of by-product and unreacted reagent.

A mixture of 1 mole of pure terephthalic acid (calculated on equivalent weight) and two moles of caustic soda as a 1.28 N aqueous solution was heated and allowed to simmer for half an hour and the resulting solution made just alkaline to phenol-phthalein. 20 moles of redistilled ethylene chlorhydrin and 0.0075 mole of sodium iodide (as a 0.15 N aqueous solution) were added and the mixture gently refluxed for 6 hours. The mixture was evaporated to dryness under vacuum on the water bath, the white residue shaken with 5 times its weight of water for some hours, then cooled to 0° C., the precipitate filtered off, washed with ice water and dried under vacuum.

The product was then heated in a stream of hydrogen for 1 hour at 200° C. and then for 3 hours at 255–265° C. It formed a homogeneous melt at 240–250° C. Heating was then continued at 255–265° C. for 3 hours under an absolute pressure of 2–3 mms. The polymer melted at about 250° C.

Having described our invention, what we desire to secure by Letters Patent is:

Process for the production of polyesters, which comprises refluxing 1 mole of sodium terephthalate with 20 moles of ethylene chlorhydrin and 0.0075 mole of sodium iodide for 6 hours, evaporating the mixture to dryness under vacuum to separate the unreacted ethylene chlorhydrin, washing the residue with water to separate the sodium chloride, heating the product in a stream of hydrogen for 1 hour at 200° C. and then for 3 hours at 255 to 265° C., and then further heating the product for 3 hours at 255 to 265° C. under an absolute pressure of 2 to 3 mms. of mercury.

JAMES GORDON NAPIER DREWITT.
JAMES LINCOLN.

REFERENCES CITED

The following references are of record in the file of this patent:

UNITED STATES PATENTS

| Number | Name | Date |
| --- | --- | --- |
| 1,733,639 | Van Schaack et al. | Oct. 29, 1929 |
| 2,465,319 | Whinfield et al. | Mar. 22, 1949 |

FOREIGN PATENTS

| Number | Country | Date |
| --- | --- | --- |
| 578,079 | Great Britain | June 14, 1946 |